United States Patent [19]

Waldrum

[11] Patent Number: 4,949,937
[45] Date of Patent: Aug. 21, 1990

[54] REMOTE THROTTLING VALVE

[76] Inventor: John E. Waldrum, 349 Fairview Ave., Ambler, Pa. 19002

[21] Appl. No.: 462,227

[22] Filed: Jan. 9, 1990

[51] Int. Cl.$^5$ .................. F16K 31/04; F16K 31/52
[52] U.S. Cl. ..................... 251/129.11; 251/129.12; 251/129.2; 251/230
[58] Field of Search .................. 251/219.11, 129.12, 251/230, 129.2

[56] References Cited

U.S. PATENT DOCUMENTS

| 1,719,898 | 7/1929 | McNeil | 251/230 X |
| 4,180,238 | 12/1979 | Muchon | 251/230 X |

Primary Examiner—Arnold Rosenthal
Attorney, Agent, or Firm—Eckert Seamans Cherin & Mellot

[57] ABSTRACT

A remote throttling valve is disclosed which includes an internal valve seat and a valve operator arranged for longitudinal movement toward and away from the valve seat to open and close the valve. A threaded worm shaft carries the valve operator and is threadedly engaged in the valve body to longitudinally move the valve operator in response to rotation of the worm shaft. A ratchet gear exteriorly connects to the threaded worm shaft and is provided with a plurality of radially outwardly projecting ratchet teeth. A reversible motor including an eccentric drive functions first and second pawl fingers of a non-planar pawl into successive engagements with the ratchet gear teeth. Clockwise rotation of the motor causes intermittent rotation of the ratchet gear in a first direction and counter-clockwise rotation of the motor will cause intermittent rotation of the ratchet gear in the opposite direction. The ratchet teeth define forward and rearward clearance spaces about the ratchet gear whereby automatic longitudinal forward and rearward movement limits are provided when the pawl fingers respectively enter the forward and rearward clearance spaces.

19 Claims, 3 Drawing Sheets

REMOTE THROTTLING VALVE

BACKGROUND OF THE INVENTION

1. Field of the Invention

The present invention relates generally to the field of liquid flow controls, and more particularly, is directed to a highly sensitive, remotely controlled, mechanical, pressure regulating valve suitable to mechanically control liquid flow without the need for end limit micro switches.

2. Discussion of the Prior Art

Control valves have long been in use to regulate the flow of liquids in pipelines for all types of fluid handling systems and installations. Such prior art liquid control valves have varied in complexity from simple, hand-operated gate valves to highly complex and sophisticated, remote, electronically controlled valves. In the case of remote control valves, it has been the common practice to employ suitable motors with motor controls wherein the opening and closing of the valve could be readily functioned by electrically controlling the motor from remote locations. It has been found that such prior art remotely controlled valves will function well enough and with sufficient accuracy when the exact quantity of liquid flow is not critical and flow sensitivity is not a prime consideration.

However, in those instances wherein exact measured quantities of liquid flow have to be reliably produced, the presently available, prior art remotely controlled valves have proved to be generally unreliable and unsatisfactory. Additionally, some of the prior art remotely controlled valves functioned too quickly and others too slowly thereby frustrating the attempts of the operator to achieve exactly the desired quantities of flow. Such precise flow control capability is especially necessary in certain chemical feed applications wherein two or more liquids must be admixed in carefully controlled quantities wherein the percentage of one chemical to the other as measured in parts per million can be reliably produced.

While the prior art remotely controlled valves could approach the predetermined mixing parameters, there still remains the need to produce a valve that can be counted upon to exactly perform as desired. Additionally, the prior art remotely controlled valves were relatively expensive in construction and required electronic limit controls at the minimum and maximum flow ends to accomplish the desired flow control conditions. Accordingly, the need remains to provide a remotely controlled valve that is sensitive throughout it's range of operation to precisely control flow characteristics in accordance with predetermined criteria and which can be relatively inexpensively produced without the need for costly electronic switches or other controls to provide automatic end limit stops.

SUMMARY OF THE INVENTION

This invention relates generally to the field of chemical piping system valves, and more particularly, is directed to a remotely controlled pressure regulating valve particularly suitable for use with precise chemical feed applications.

The remote throttling or pressure regulating valve of the present invention comprises generally an electrical motor which, upon energization, rotates an eccentric drive. A generally arcuate, bifurcated, non-planar pawl operatively secures to the eccentric device crank pin and is positioned to urge either of a pair of arcuately spaced, opposite, pawl fingers selectively into engagement with a ratchet gear for opening or closing the valve, depending upon the direction of rotation of the operating motor. The pressure relating valve of the present invention comprises a valve seat and a generally truncated-conically shaped valve operator which is movable toward or away from the seat to precisely control liquid flow through the valve in response to operation of the pawl. A liquid chemical inlet is provided in the valve body ahead of the seat whereby all liquid chemical flow through the throttling valve will be monitored and controlled at the valve seat.

The valve operator is longitudinally movable within a recess provided in the valve body and rearwardly connects to an operating shaft, which shaft is provided with an externally threaded portion or worm. The worm shaft is threadedly engaged with internal threads provided in the valve body to thereby longitudinally move relative to the body when the shaft is rotated. A ratchet gear rearwardly secures to the worm shaft exteriorly of the valve body and is provided with a plurality of circumferentially spaced ratchet teeth. The ratchet gear moves longitudinally of the valve body in unison with the longitudinal movement of the worm shaft and the valve operator upon rotation of the gear. The spaced apart pawl fingers selectively sequentially engage the ratchet teeth of the ratchet gear in response to the direction of rotation of the motor and the eccentric rotation of the crank pin. The sequential operative movements of the pawl caused the ratchet gear to rotate in either a clockwise or counter-clockwise direction. This in turn rotates the worm shaft which causes the valve operator to longitudinally move toward or away from the valve seat in direct response to the degree of rotation of the ratchet gear.

The ratchet teeth of the ratchet gear are all formed of the same length and height and are arranged about the outer periphery of the ratchet gear in position to define a forward gear annular clearance space and a rearward gear annular clearance space. It is a significant feature of this invention to construct the pawl of non-planar configuration wherein the said arcuately spaced pawl fingers will not be in planar alignment, but rather, are positioned in longitudinally spaced apart planes. The longitudinal spacing between the pawl fingers is such that when the ratchet gear is turned sufficiently in one direction wherein longitudinal movement of the ratchet gear relative to the valve body and to the pawl causes one pawl finger to be positioned in either the forward or rearward ratchet gear clearance space, depending upon the direction of ratchet gear rotation, the other pawl finger will be positioned over the ratchet teeth and can be brought into sequential engagement with the ratchet gears upon reversal of the direction of operation of the motor.

Accordingly, when the motor is operated in a first direction, the first of the pawl fingers will be serially brought into contact with successive ratchet gear teeth. This in turn causes the ratchet gear to rotate in a first direction in stepped increments and to successively move the worm shaft and consequently the shaft connected valve operator either toward or away from the valve seat, depending upon the direction of rotation of the motor. When the throttling valve is either completely open or completely closed, it is an essential design feature of this invention that the pawl finger that was utilized to move the valve operator to either the completely open or to the completely closed position will then reside in either the forward clearance space or the rearward clearance space. Accordingly, continued rotation of the motor in the same direction will have no further effect inasmuch as the pawl finger will then reside entirely within the forward or rearward clearance space and can no longer contact the ratchet gear teeth to open or close the valve.

Upon reversing the direction of rotation of the motor, for example, by employing a conventional double pole, double throw toggle switch, the other or second pawl finger will then be brought into contact with successive ratchet teeth of the ratchet gear. This direction of motor rotation will then cause stepped movement of the ratchet gear in the opposite direction and accordingly, corresponding longitudinal movement of the valve operator either toward or away from the valve seat. When the ratchet gear is rotated sufficiently so that the second pawl operating finger is positioned within the second annular clearance space, then no further rotation of the ratchet gear in the reverse direction will then be possible, thereby providing an automatic, inherent limit.

Accordingly, the combination of the non-planar pawl, the equal length and planar alignment of the ratchet gear teeth and the longitudinal movement of the worm shaft cooperate and function to provide forward and rearward mechanical end limits without the need for micro switches, solenoids or any other type of electrical or electronic limiting devices to control the forward and rearward limits of motion of the valve operator.

It is therefore an object of the present invention to provide an improved remotely controlled throttling valve of the type set forth.

It is another object of the present invention to provide a novel remote throttling valve that is designed and intended to accurately and precisely control fluid flow and without employing solenoids or micro switches to provide forward and rearward end limits of valve operator movement.

It is another object of the present invention to provide a novel remotely operated throttling valve comprising a valve body, inlet and outlet connections to the body, a valve seat positioned intermediate the inlet and outlet connections to control liquid flow therethrough, a valve operator longitudinally movable toward and away from the seat, a threaded worm connected to the valve operator, a ratchet gear secured to the threaded worm to axially move the valve operator toward or away from the valve seat in response to the direction of rotation of the ratchet gear, a non-planar pawl having a pair of arcuately spaced fingers selectively engageable with the teeth of the ratchet gear and a reversible motor including an eccentric drive to alternately successively engage the opposed fingers of the pawl with the ratchet teeth to cause movement of the valve operator toward or away from the valve seat.

It is another object of the present invention to Provide a novel remotely controlled throttling valve that is simple in design, inexpensive in manufacture and trouble free when in operation.

Other objects and a fuller understanding of the invention will be had by referring to the following description and claims of a preferred embodiment thereof, taken in conjunction with the accompanying drawings, wherein like reference characters refer to similar part throughout the several views and in which:

DESCRIPTION OF THE PREFERRED EMBODIMENT OF THE INVENTION

Figure 2:
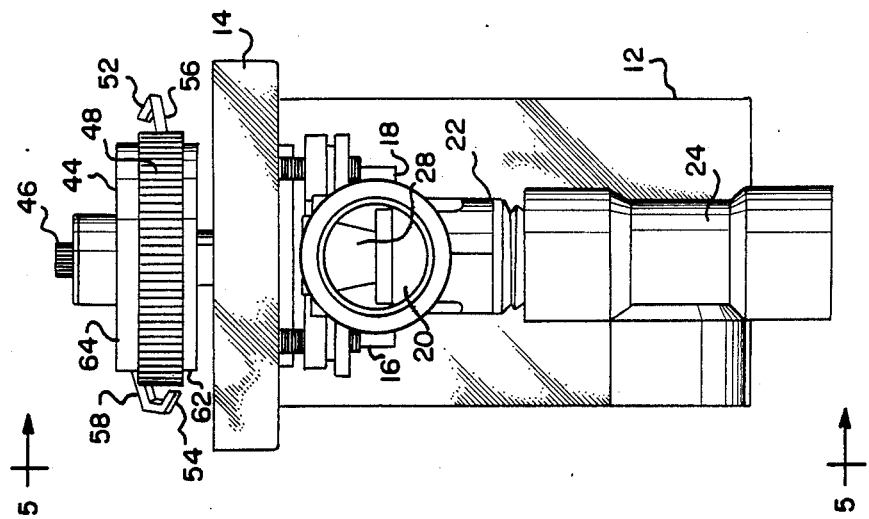
FIG. 2 is a top plan view of the throttling valve of FIG. 1.

Although specific terms are used on the following description for the sake of clarity, these terms are intended to refer only to the particular structure of the inventor selected for illustration in the drawings, and are not intended to define or limit the scope of the invention.

Figure 1:
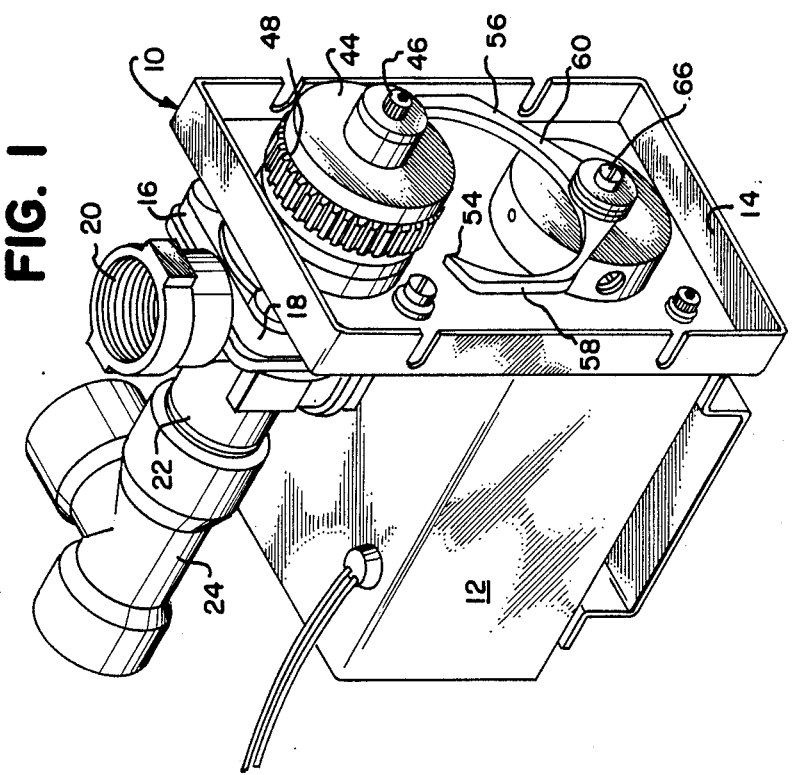
FIG. 1 is a perspective view of a remotely controlled throttling valve in accordance with the teachings of the present invention.

Referring now the drawings, there is shown in FIG. 1 a remote throttling or pressure regulating valve generally designated 10 comprising an electrical motor 12 which is secured for operation upon a suitable mounting stand 14 in sturdy, known manner. A liquid chemical pump 16 also secures to the mounting stand 14 in spaced relationship above the motor 12 for cooperating operation as hereinafter more fully set forth.

Figure 3:
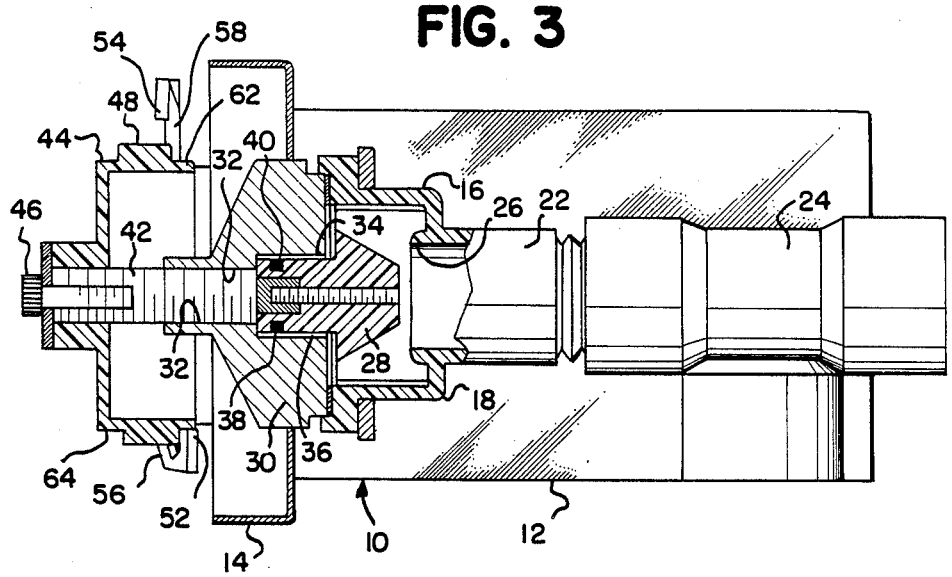
FIG. 3 is a top plan view of the throttling valve similar to FIG. 2 with parts partially broken away and in section to expose interior construction details and showing the valve operator in a first, open position.
Figure 4:
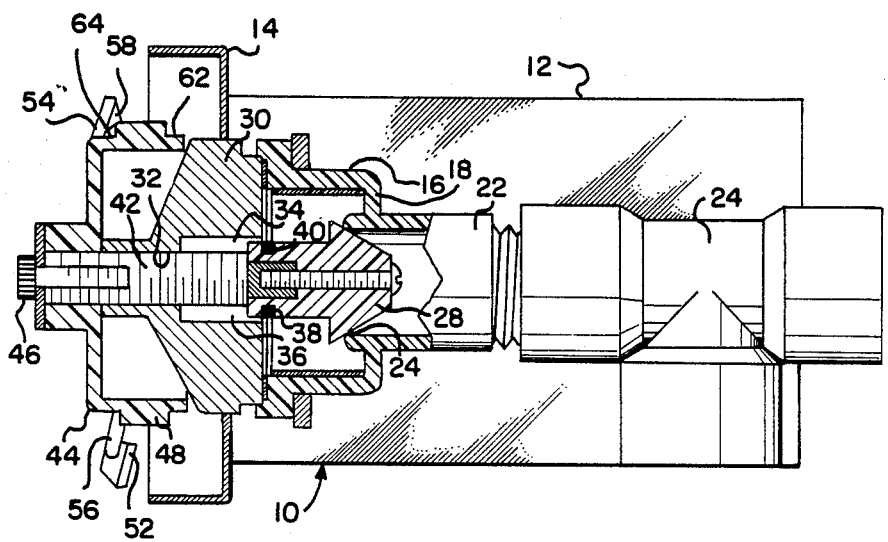
FIG. 4 is a top plan view, partially broken away similar to FIG. 3, showing the valve operator in a second, closed position.

As best seen in FIGS. 2, 3 and 4, the pump 16 comprises generally a body 18 having a suction or inlet opening 20 and a discharge or outlet opening 22. Preferably, a venturi or a T-shaped fitting 24 can be connected to the pump outlet opening 22 to provide for connection and mixing of a second liquid chemical or perhaps water, depending upon the objective or use of the remote throttling valve 10.

As best seen in FIGS. 3 and 4 and as partially illustrated in FIG. 2, the pump 16 comprises an internal valve seat 26 which is positioned intermediate the suction or inlet opening 20 and the discharge or outlet opening 22 to provide control of the flow of liquid chemical (not shown) between the inlet and outlet of the pump. A generally truncated conical valve operator 28 is axially longitudinally movable relative to the valve seat 26 between the fully opened position as illustrated in FIG. 3 to the fully closed position as illustrated in FIG. 4, upon rearward or forward longitudinal indexing of the worm shaft 42 in response to motor operation as hereinafter more fully set forth.

The pump 16 further comprises a block 30 which defines an interior space and which is provided with a communicating, longitudinally extending, internally threaded bore or first valve moving means 32. The threaded bore 32 terminates forwardly in an enlarged, axially aligned receiving chamber 34 of diameter suitable to receive the valve operator body 36 therewithin as the valve operator is urged toward its rearward, valve open position as illustrated in FIG. 3. As shown, the valve operator body 36 preferably may be integrally formed with the valve operator 28.

Sufficient clearance is provided between the wall defining the valve receiving chamber 34 and the outer periphery of the valve operator body 36 to provide a relatively tight fit in a manner but to permit longitudinal movement of the valve operator without binding or friction. The sliding interface between the valve operator body 36 and the valve receiving chamber 34 can be sealed in known manner, for example, by providing a circular recess 40 in the valve operator body 36 and by inserting a conventional 0-ring gasket 36 within the circular recess 40. Accordingly, the interface between the valve receiving chamber 34 and the valve operator body 36 will be continuously sealed under all operating conditions and at all longitudinally adjusted positions of the valve operator body.

A worm shaft or second valve moving means 42 having an externally threaded section axially, rearwardly extends from the valve operator body 36 and is threadedly engaged with the internally threaded bore 32 which is provided in the pump block 30. Accordingly, as the threaded worm 42 is turned within the threaded bore or opening 32 in either a clockwise or a counter-clockwise direction, the attached valve operator 28 can be caused to longitudinally move within the pump body 18 to either approach the valve seat 36 or to retreat from the valve seat. This longitudinal movement of the valve operator 28 precisely controls the rate of flow of liquid chemical (not shown) through the pump 16 from full flow conditions as illustrated in FIG. 3 to full stop conditions as illustrated in FIG. 4.

A ratchet gear 44 endwardly secures to the threaded worm shaft exteriorly of the pump body 18 in a secure manner, for example, by employing a conventional threaded fastener 46 in a known type of interconnection. Accordingly, when the ratchet gear 44 is caused to rotate in the manner hereinafter are fully set forth, the ratchet gear in turn will rotate the threaded worm shaft 42 to either advance the valve operator 28 longitudinally toward the valve seat 26 or to urge the valve operator 28 rearwardly away from the valve seat 26, depending upon the direction of rotation of the motor 12 and consequently, the direction of rotation of the ratchet gear 44.

Figure 5:
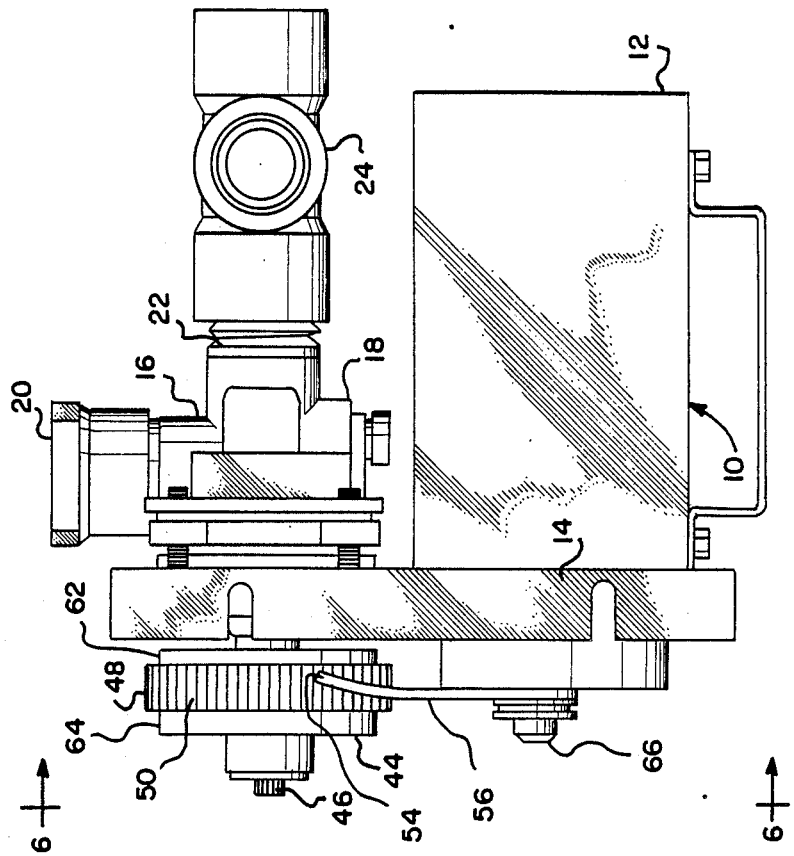
FIG. 5 is a side elevational view looking from line 5—5 on FIG. 2, in the direction of the arrows.
Figure 6:
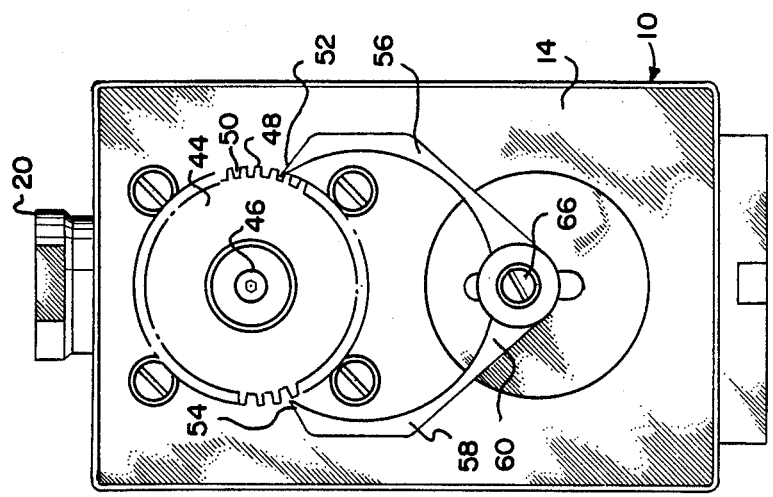
FIG. 6 is an end elevational view looking from line 6—6 on FIG. 5, in the direction of the arrows.

As best seen in FIGS. 5 and 6, the ratchet gear 44 comprises a plurality of radially outwardly extending, circularly spaced, similar ratchet teeth 48. The ratchet teeth are defined one from the other by valleys 50 of sufficient depth to receive therein successively the tips of the pawl fingers 52, 54 of the first and second arms 56, 58 which define the operating pawl 60. As shown, the ratchet teeth 48 are medially positioned on the ratchet gear 44 and define forward and rearward annular clearance spaces 62, 64 forwardly and rearwardly of the ratchet teeth 48.

Referring now to FIGS. 2, 3 and 4, it will be observed that the fingers 52, 54 of the pawl 60 are arranged in non-planar, longitudinally spaced alignment. When the ratchet gear 44 is rotated upon successive engagements of a pawl finger 52 or 54 with successive ratchet teeth 48, depending upon the direction of rotation, to longitudinally move the ratchet gear 44 sufficiently until the operative pawl finger 52 or 54 aligns with a forward or rearward annular clearance space 62, 64, the other of the pawl fingers 52 or 54 will be positioned over the ratchet teeth 48. Reversing the direction of motor rotation will cause the other pawl finger 52 or 54 to be brought into successive engagement with the ratchet teeth 48 to thereby cause the pawl 60 to rotate the ratchet gear 44 in the opposite direction. It will thus be seen that the forward and rearward annular clearance spaces 62, 64 function as automatic forward and rearward mechanical limits of longitudinal travel of the ratchet gear 44 (and consequently the valve operator 28) to thus eliminate the need for additional limit switches, end control micro switches and the like.

As best seen in FIGS. 5 and 6, the output shaft of the motor 12 is arranged to provide an eccentric drive 66 for the pawl 60 when the motor 12 is energized. As illustrated, the pawl 60 secures to the output shaft in an eccentric interconnection 66 and in turn, either of the pawl fingers 52 or 54 is urged into successive engagements within the valleys 50 between the ratchet gear teeth 48, depending upon the direction of motor rotation, to incrementally rotate the ratchet gear 44 in either a clockwise direction or a counter-clockwise direction. This in turn causes rotative movement of the threaded worm shaft 42 within the threaded bore 32 to thereby longitudinally move the valve operator 28.

In operation, assuming the valve 10 to be in the fully open position as illustrated in FIG. 3, one pawl finger 54 will be positioned in alignment with the forward annular clearance space 62 and the other pawl finger 52 of the opposed pawl arm 56 will be longitudinally aligned over the ratchet teeth 48 to engage successively the various ratchet teeth 48 upon proper direction of rotation of the motor 12. Rotation of the motor 12 in a first direction, for example, a clockwise direction as viewed in FIG. 6, will cause the eccentric motion of the eccentric interconnection 66 to urge the pawl finger 52 into engagement with the ratchet teeth 48, thereby urging the ratchet gear 44 also in a clockwise direction as viewed in FIG. 6. Clockwise rotation of the ratchet gear 44 will cause simultaneous rotation of the threaded worm shaft 42 relative to the threaded bore 32 of the valve block 30. Rotation of the worm shaft 42 within the threaded bore 32 will cause the valve operator 28 to longitudinally move to the right as viewed in FIGS. 3 and 4 to approach the valve seat 26.

It will be noted that the ratchet gear 44 is affixed to the threaded worm shaft 42 by the fastener 46 and so the ratchet gear 44 will also be longitudinally moved toward the valve seat 26 in unison with the valve operator 28. The longitudinal forward movement of the ratchet gear 44 will cause the operating finger 52 of the pawl 60 to traverse along the ratchet teeth 48 from right to left as viewed in FIG. 3. When the ratchet gear 44 is longitudinally moved sufficiently to cause the rearward annular clearance space 64 to align with the pawl finger 52, it will be appreciated that the pawl finger 52 can no longer engage the ratchet teeth 48, even though the motor 12 continues to operate in the first direction. Therefore, continued operation of the motor will no longer cause any rotation of the ratchet gear 44 and consequently, there can be no additional longitudinal movement of the valve operator 28. In this position, the valve will be fully closed.

Accordingly, the positioning of the pawl finger 52 within the rearward annular clearance space 64 serves as an automatic, mechanical stop to thereby positively prevent any further forward movement of the valve operator 28. The geometry of the system is so designed that when the ratchet gear 44 is turned sufficiently to position the first pawl finger 52 in alignment with the rearward annular clearance space 64, the valve operator 28 will be engaged upon the valve seat 26 to thereby prevent any further fluid flow through the valve 10. It will therefore be observed that an automatic forward limit switch has been built into the device which functions entirely mechanically without the need for additional electrical limit switches, micro switches and the like. See FIG. 4.

It is contemplated that the remote throttling valve 10 of the present application can be employed as part of an agricultural spray system mounted upon a suitable carrier, for e ample an all terrain vehicle. In known manner, suitable motor energization switches and motor direction reversing switches can be provided. This will then enable the operator to have complete and precise control of the liquid flow from the remote location within the vehicle cab.

With the parts arranged as in FIG. 4, when it is desired to open the valve 10, the direction of rotation of the motor 12 can be reversed in well known manner by simply employing a suitable toggle switch (not shown) to reverse motor rotation. Rotation of the eccentric drive 66 in a counter-clockwise direction as viewed in FIG. 6 will then cause the second pawl finger 54 to successive engage the ratchet gear teeth 48 within the valleys 50 defined therebetween to thereby incrementally rotate the ratchet gear 44 in a counter-clockwise direction. Counter-clockwise rotation of the racket gear 44 will cause the exterior threads of the worm shaft 42 to turn within t he interior threads of the threaded opening or bore 32 to thereby cause the valve operator 28 to axially, rearwardly move relative to the valve seat 26 from the fully closed position as illustrated in FIG. 4 toward the fully open position as illustrated in FIG. 3.

Of course, operation of the motor 12 can be stopped at any time to thereby precisely control the volume of fluid flow through the valve 10, depending upon the position of the valve operator 28 relative to the valve seat 26. As the valve operator 28 approaches its fully open position as illustrated in FIG. 3, it will be noted that the ratchet gear 44 will longitudinally move relative to the pawl 60 until the second pawl finger 58 aligns with the forward annular clearance space 62, whereby further rearward movement of the ratchet gear 44 will be automatically prevented. Accordingly, the interaction of the second pawl finger 54 within the forward annular clearance space 62 functions as an automatic rearward limit whereby further rearward longitudinal movement of the ratchet gear 44 and the affixed threaded worm shaft 42 and valve operator 28 will be automatically, mechanically prevented.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of 1 invention should not be limited by the foregoing specification, but rather, only by the scope of the claims appended hereto

WHAT IS CLAIMED IS:

1. In a valve of the type having a body defining a hollow interior, an inlet opening communicating with the body interior, an outlet opening communicating with the body interior, a valve seat within the body intermediate the inlet and outlet openings, a movable valve operator within the body in alignment with the valve seat and a worm shaft means connected to the valve operator to move the valve operator towards and away from the valve seat, a portion of the worm gear means extending exteriorly of the body, the improvement comprising a ratchet gear having an outer diameter, the ratchet gear being connected to the said portion of the worm shaft means to rotate the worm shaft means when the ratchet gear is rotated, the worm shift means and the ratchet gear being adapted to be moved longitudinally of valve body upon rotation;

the ratchet gear comprising a plurality of circularly spaced, ratchet teeth extending radially outwardly from the outer periphery, the ratchet gear having a width defined by a front surface and a rear surface, the length of the ratchet teeth being less than the width of the ratchet gear, the ratchet teeth defining a forward annular clearance space about the ratchet gear between the ratchet teeth and the ratchet gear front surface and a rearward annular clearance space about the ratchet gear between the ratchet teeth and the said ratchet gear rear surface;

a pawl selectively engageable with the ratchet teeth of the ratchet gear, the pawl comprising a pair of spaced first and second pawl fingers;

a motor means including an eccentric drive operatively connected to the pawl, the motor means being reversible and being alternately operable in a first, clockwise direction and in a second, counter-clockwise direction, the eccentric drive urging the first pawl finger into successive contacts with ratchet teeth to rotate the ratchet gear in a clockwise direction when the motor means is rotated in a first direction, the eccentric drive urging the second pawl finger into successive contacts with ratchet teeth to rotate the ratchet gear in a counter-clockwise direction when the motor means is rotated in the second, opposite direction;

whereby the valve operator will be advanced toward the seat when the motor means is rotated in the first direction and the valve operator will be withdrawn away from the seat when the motor means is rotated in the second direction.

2. The valve of claim 1 wherein the first and second pawl fingers are arranged in non-planar alignment.

3. The valve of claim 2 wherein the diametrical spacing between the first and second pawl fingers is greater than the said diameter of the ratchet gear.

4. The valve of claim 2 wherein the first and second pawl fingers are positioned respective in planes, which planes are longitudinally spaced relative to the ratchet gear.

5. The valve of claim 4 wherein the ratchet gear is adapted to move longitudinally relative to the pawl as the ratchet gear is rotated by the successive contacts of the pawl fingers.

6. The valve of claim 5 wherein the first pawl finger aligns with the rearward annular clearance space when the valve operator contacts the valve seat to thereby prevent additional forward movement of the valve operator relative to the valve seat.

7. The valve of claim 6 wherein the second pawl finger aligns with portions of the ratchet teeth when the first pawl finger aligns with the rearward annular clearance space, whereby, upon reversal of the direction of rotation of the motor means, the successive contacts of the second pawl finger will rotate the ratchet gear in a direction to move the valve operator away from the valve seat.

8. The valve of claim 6 wherein the second pawl finger aligns with the forward annular clearance space when the valve operator is moved sufficiently away from the valve seat to thereby prevent additional rearward movement of the valve operator relative to the valve seat.

9. The valve of claim 1 wherein the valve body is provided with a threaded bore in fluid communication with the body interior and wherein the worm shaft means comprises an exteriorly threaded worm shaft, the worm shaft being threadedly engaged within the threaded bore whereby rotative movement of the worm shaft within the threaded bore will cause longitudinal movement of the worm shaft relative to the valve seat.

10. The valve of claim 1 and sealing means interposed between the valve operator and the valve body to prevent fluid leakage between the valve operator and the valve body in all longitudinally adjusted positions of the valve operator.

11. A remotely operated throttling valve comprising a valve body having a threaded bore, inlet and outlet connections to the body, a valve seat positioned interiorly of the body intermediate the inlet and outlet connections to control liquid flow therethrough, a valve operator longitudinally movable toward and away from the seat, a threaded worm shaft connected to the valve operator, the worm shaft being threadedly engaged within the bore, a ratchet gear secured to the worm shaft to axially move the valve operator toward or away from the valve seat in response to the direction of the rotation of the ratchet gear, a non-planar pawl having a pair of arcuately and longitudinally spaced, opposed fingers selectively engageable with the teeth of the ratchet gear and a reversible motor means including an eccentric drive connected to the pawl to alternately cause successive engagement of the opposed fingers of the pawl with the ratchet teeth of the ratchet gear to cause rotation of the ratchet gear and consequent movement of the valve operator toward or away from the valve seat, depending upon the direction of rotation of the motor means.

12. The valve of claim 11 wherein the fingers of the pair of fingers are positioned respective in planes, which planes are longitudinally spaced relative to the ratchet gear.

13. The valve of claim 12 wherein the ratchet gear is adapted to move longitudinally relative to the pawl as the ratchet gear is rotated by the successive contacts of the pawl fingers with the ratchet gear teeth.

14. The valve of claim 13 wherein the ratchet gear comprises a gear body having an outer periphery and a preselected width defined by a front gear surface and a rear gear surface and wherein the lengths of the ratchet teeth are less than the width of the ratchet gear body.

15. The valve of claim 14 wherein the ratchet teeth are medially positioned about the outer periphery of the ratchet gear body.

16. The valve of claim 15 wherein the ratchet teeth define a forward annular clearance space between the ratchet teeth and the said ratchet gear front surface had a rearward annular clearance space between the ratchet teeth and the said ratchet gear rear surface.

17. The valve of claim 16 wherein the first pawl finger aligns with the rearward annular clearance space when the valve operator contacts the valve seat to thereby prevent additional forward movement of the valve operator relative to the valve seat.

18. The valve of claim 17 wherein the second pawl finger aligns with portions of the ratchet teeth when the first pawl finger aligns with the rearward annular clearance space, whereby, upon reversal of the direction of rotation of the motor means, the successive contacts of the second pawl finger will rotate the ratchet gear in a direction to move the valve operator away from the valve seat.

19. The valve of claim 18 wherein the second pawl finger aligns with the forward annular clearance space when the valve operator is moved sufficiently away from the valve seat to thereby prevent additional rearward movement of the valve operator relative to the valve seat.

* * * * *